United States Patent Office 3,278,462
Patented Oct. 11, 1966

3,278,462
ION EXCHANGE RESINS FROM DIPHENYL ETHER POLYMERIC DERIVATIVES, PROCESS FOR MAKING SAME AND USE IN REMOVING ALKYLBENZENE SULFONATES
Robert E. Anderson, Donald E. Ballast, and David R. Ball, Midland, Mich., assignors to The Dow Chemical Company, Midland, Mich., a corporation of Delaware
No Drawing. Filed Apr. 22, 1963, Ser. No. 274,808
13 Claims. (Cl. 260—2.1)

This invention relates to new ion exchange resins. More particularly, it relates to novel ion exchange resins wherein the active ion exchange groups are chemically bonded to an insoluble resinous diphenyl ether condensation polymer. Still more specifically, these novel ion exchange resins have active ion exchange groups chemically bonded to a resinous matrix comprising in major proportion a plurality of diphenyl ether moieties linked and cross-linked with methylene bridges.

In recent years many different types of organic ion exchange resins have been synthesized. At present, the most important commercial materials are those prepared from a resinous copolymer of a vinylaromatic compound, e.g., styrene, with a cross-linking agent such as divinylbenzene. Active ion exchange groups are then attached to such a resinous matrix by further chemical reactions to provide the desired ion exchange capacity. For example, commercially valuable cation exchange resins are prepared by sulfonation of a resinous styrene-divinylbenzene copolymer. By halomethylation and subsequent amination of a similar resinous copolymer matrix, anion exchange resins of established commercial importance are prepared.

In practice, complex multi-step processes and special techniques are generally required for the production of suitable ion exchange resins. As a result these ion exchange resins are costly and commercial utilization has been limited to applications where repeated regeneration and reuse of the resin has been possible, such as water softening, removal of metal impurities from process streams, separation and purification of rare earth salts, etc. In many other applications where use of these ion exchange resins is highly desirable but where regeneration and reuse is not possible or feasible, their use has been severely limited because of unfavorable economics.

It is well known that a severe and urgent water pollution problem has been created by the use of alkylbenzene sulfonates as the major active ingredient in many commercial detergents. Since the alkylbenzene sulfonates are only partially degraded or removed in conventional water treatment processes, serious contamination of surface and ground water supplies has occurred in many areas. Effective removal of alkylbenzene sulfonates from dilute aqueous wastes can be achieved by treatment with strongly basic quaternary ammonium anion exchange resins. However, regeneration of the resin loaded with alkylbenzene sulfonate is extremely difficult and on a single use basis the cost of the treatment with present commercial quaternary ammonium resins is prohibitive.

An effective but less expensive anion exchange resin would thus find great utility in water treatment processes. Expendable ion exchange resins are also highly desirable for use in the polishing operation for purification of boiler condensates. Still another important application which depends on the development of less expensive ion exchange resins is an expendable mixed-bed demineralization unit, using a mixture of cation and anion exchange resins in their acidic and basic forms, respectively, for purification of drinking water.

It has now been discovered that the insoluble hydrophobic, cross-linked, resinous polymers obtained by the condensation polymerization of a reactive aromatic material comprising in major proportion one or more diphenyl ether derivatives, such as halomethyl-, hydroxymethyl- or alkoxymethyldiphenyl ethers, can be used as matrices for carrying active or potentially active ion exchange groups. As a result, new water-insoluble ion exchange resins are obtained having ion exchange groups chemically bonded to a resinous polymer matrix comprising in major proportion a plurality of diphenyl ether moieties linked and cross-linked with methylene bridges. More specifically, the ion exchange groups are chemically bonded to aromatic nuclei of the diphenyl ether moieties as substituents of the general formula:

wherein each $n$ is an integer from 0 to 2 inclusive, and Z is a radical containing an active or potentially active ion exchange group.

Thus these new ion exchange resins are characterized by having in the resinous polymeric structure a plurality of moieties of the general Formula I:

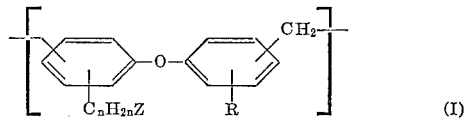

wherein each R is independently selected from the group consisting of —H, >CH$_2$, and —C$_n$H$_{2n}$Z. Note that the radical Z, containing an active or potentially active ion exchange group, can be chemically bonded either directly to the aromatic nuclei ($n=0$) or to a C$_1$-C$_2$ alkyl side chain ($n=1$ or 2).

By appropriate choice of the ion exchange groups, anion, cation, and chelate exchange resins have now been prepared from insoluble resinous diphenyl ether condensation polymers. These new ion exchange resins have ion exchange capacities and rates which are at least as high as many present commercial ion exchange resins. Indeed since the aromatic content of the resinous diphenyl ether polymer is somewhat greater than that of a resinous polystyrene, the dry weight capacity of these new ion exchange resins for a given average degree of substitution of each aromatic nucleus is greater. Furthermore, these new ion exchange resins have excellent chemical and thermal stability. The resinous diphenyl ether polymer matrix is extremely resistant to thermal or oxidative attack. At the same time these new resins can be obtained with physical properties such that they are easily crushed, even when wet, into extremely fine particles. This form is particularly desirable for expendable resins in certain applications, as for example, in the treatment of laundry wastes to remove alkylbenzene sulfonates.

In addition, because of such factors as relatively inexpensive raw materials, the stability of various intermediates, the ease of condensation polymerization and the chemical reactivity of the intermediate resinous diphenyl ether condensation polymers, significant and important process economies are possible which result in less expensive ion exchange resins without loss of capacity.

Still other advantages will appear from the following description of several specific embodiments of the invention.

DEFINITIONS

As used above and throughout the specification and claims:

(1) The term "ion exchange" refers to anion, cation, and chelate exchange.

(2) The term "active ion exchange group" refers to groups, such as —NH$_3^+$, >NH$_2^+$, >NH$^+$—, >N$^+$<, >S$^+$—, and >P$^+$<, or —SO$_3$H, —OH, —COOH, —$PO_3H_2$, —$HPO_2H$, and salts thereof, which when present in an insoluble resin give the resin the property of exchanging or combining with ions from a solution.

(3) The term "potentially active ion exchange group" refers to nitriles, esters, amides, anhydrides, acid chlorides, and related derivatives of carboxylic, phosphoric, and sulfonic acids, and to other similar groups which may be converted by simple hydrolysis into active ion exchange groups.

INTERMEDIATE RESINOUS DIPHENYL ETHER CONDENSATION POLYMER

Diphenyl ether is a reactive aromatic compound which undergoes aromatic substitution reaction preferentially at the 2- and 4-positions of each aromatic ring, i.e., ortho and para to the ether group. Thus, for example, Doedens and Rosenbrock disclose in United States Patent 3,047,518 that chloromethylation of diphenyl ether gives a mixture of chloromethyldiphenyl ethers containing from 1 to 4 chloromethyl groups per diphenyl ether moiety. The exact composition of the chloromethylation product is dependent upon reaction conditions and particularly on the proportion of chloromethylating agent employed. Several typical chloromethyldiphenyl ether (CMDPE) compositions are given in Table 1.

TABLE 1.—TYPICAL CHLOROMETHYLDIPHENYL ETHER COMPOSITIONS

|  | CMDPE | | |
| --- | --- | --- | --- |
|  | 17 | 25 | 32 |
| Wt. percent Cl | 17.6 | 25.2 | 32.0 |
| Mole Ratio: $ClCH_2$—/DPE | 1.12 | 1.85 | 2.80 |
| Composition (mole percent): | | | |
| Diphenyl ether (DPE) | 17.3 | 0 | 0 |
| 2-chloromethyl DPE | 5.3 | 0.3 | 0 |
| 4-chloromethyl DPE | 42.9 | 2.4 | 0 |
| 2,4′-bis(chloromethyl)DPE | 10.8 | 17.7 | 1.9 |
| 4,4′-bis(chloromethyl)DPE | 20.6 | 68.5 | 8.6 |
| Tris(chloromethyl)DPE | 2.3 | 10.5 | a 89 |
| Tetrakis(chloromethyl)DPE | <1 | <1 | <2 | a 17% 2,2′,4- and 72% 2,4,4′-tris(chloromethyl)DPE.

These chloromethyldiphenyl ethers and other similar reactive diphenyl ether derivatives readily undergo condensation polymerization to an insoluble resinous product. As described by Doedens in United States Patent 2,911,380, the polymerization involves condensation between a reactive halomethyl group of one halomethyldiphenyl ether molecule with a second diphenyl ether moiety, presumably at an unsubstituted 2- or 4-position, to form a methylene bridge with elimination of hydrogen halide. In the absence of catalysts, this condensation polymerization generally requires a reaction temperature greater than about 120° C. However, in the presence of a Lewis acid catalyst, such as aluminum chloride, zinc chloride, ferric chloride, and ferric phosphate, it occurs rapidly at a temperature between about 90° and 110° C. Doedens also discovered that hydrogen halide released during the polymerization can be trapped within the polymerizing mass so that the product from bulk polymerization is obtained as a resinous foam. A more detailed description of a preferred process for obtaining such bulk resinous foams is given by Hebert, Doedens and Rosenbrock in United States Patent 3,075,929.

As further described by Doedens, the reactant mixture for condensation polymerization may also contain in addition to the halomethyldiphenyl ether, minor amounts of up to 10 to 20 weight percent of other reactive, non-halomethyl aromatic materials as modifiers. Examples of such modifiers are diphenyl ether, di(p-tolyl)ether and other similar aromatic ethers, phenolic compounds having at least one active aromatic ring position, biphenyl, toluene, and other similar aromatic compounds. Polymeric materials having a reactive aromatic nucleus can also be employed as modifiers. At least a portion of such reactive, non-halomethyl components becomes chemically bonded within the resinous diphenyl ether polymer.

The process as described by Doedens in United States Patent 2,911,380 is thus broadly applicable to the preparation of resinous diphenyl ether condensation polymers from a reactive aromatic material having an average of at least 1.1 halomethyl groups per aromatic molecule and comprising in major proportion by weight a halomethyldiphenyl ether having an average of from 1.1 to 4.0 halomethyl groups per diphenyl ether moiety, each halogen being bromine or chlorine.

To obtain the desired insoluble resinous polymer, it is necessary that the reactive aromatic material contain an average of at least 1.1 halomethyl groups per aromatic molecule. If the average halomethyl content is less than about 1.1, insoluble resinous polymers will not be obtained unless an additional cross-linking agent is employed. On the other hand, since polymerization proceeds by the condensation of a halomethyl group with a reactive site on the nucleus of another aromatic molecule, an average of more than about 3 halomethyl groups per aromatic molecule is generally not desirable since there are then fewer residual reactive sites for condensation.

Halomethyl groups present in excess of the number required for polymerization remain and provide sites for the introduction of certain ion exchange groups as described below. If a greater number of residual halomethyl groups are desired, it is possible to halomethylate the resinous diphenyl ether polymer further to a maximum of about 2 residual halomethyl groups per diphenyl ether moiety. To halomethylate beyond this point, more strenuous conditions are required and excessive cross-linking generally occurs. On the other hand, for low capacity ion exchange resins or for substituting the ion exchange group directly on the aromatic nuclei it is often desirable to have a minimum of residual halomethyl groups. This is achieved by using a low halomethyl content in the initial polymerization reaction. For example, homopolymerization of CMDPE–17, crude chloromethyldiphenyl ether, having an average of 1.12 chloromethyl groups per diphenyl ether moiety (cf. Table 1), gives a resinous polymer containing essentially no residual chloromethyl groups.

In the practice of the invention described herein, it is preferred to employ an insoluble resinous diphenyl ether condensation polymer prepared by homopolymerization of a halomethyldiphenyl ether. Suitable halomethyldiphenyl ethers are most easily prepared by chloromethylation or bromomethylation of diphenyl ether as described by Doedens. It is often particularly advantageous to use a crude mixture of halomethyldiphenyl ethers having an average of at least 1.1 halomethyl groups per diphenyl ether moiety such as the crude product mixtures shown in Table 1. Other methods for preparing halomethyldiphenyl ethers are known such as the side chain chlorination of a suitable alkyldiphenyl ether. In addition, other diaromatic ethers, such as di(p-tolyl)ether or di(p-chlorotolyl)ether can be halomethylated and polymerized but the relatively inactive ring substituents may limit the scope of further reactions after polymerization.

The solid resinous diphenyl ether foam obtained by the bulk polymerization of a suitable halomethyldiphenyl ether can be used directly in the preparation of ion exchange resins as described below. However, it is often desirable to crush or grind the somewhat friable bulk foam to obtain finer resinous particles prior to further chemical processing. Either in bulk or finely divided form this intermediate resin is extremely stable in storage even under adverse conditions of temperature and humidity.

Still other alternate methods for the synthesis of the desired backbone structure of diphenyl ether groups linked and cross-linked with methylene bridges will be evident to those skilled in the art. For example, the condensation polymerization of an alkoxymethyl- or hydroxymethyldiphenyl ether having an average of at least 1.1 alkoxymethyl or hydroxymethyl groups per diphenyl ether moiety provides a similar resinous matrix to which active or potentially active ion exchange groups can be chemically bonded as described below. The resinous condensation polymer of an alkoxymethyl- or hydroxymethyldiphenyl ether having only a few residual substitutent groups can be halomethylated in conventional manner to give an intermediate substantially identical with that obtained by the condensation polymerization of halomethyldiphenyl ethers.

In summary, the intermediate resinous diphenyl ether condensation polymer which is employed as the resinous matrix in the invention described herein is obtained by polymerization of a reactive aromatic material comprising in major proportion a diphenyl ether derivative of the general Formula II:

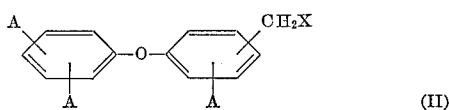

(II)

wherein each A individually is H or $C_nH_{2n}X$, $n$ being an integer from 0-2 inclusive, and X is Cl, Br, OH, or OR' where R' is a $C_1$-$C_4$ alkyl group. The resulting insoluble resinous matrix contains a plurality of diphenyl ether moieties of the general Formula III:

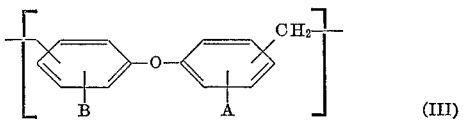

(III)

wherein each A individually is defined as above and each B individually is A or a methylene bridge. To this matrix many active or potentially active ion exchange groups can be chemically bonded as described below to provide new and valuable ion exchange resins which are further characterized by having in the polymeric structure a plurality of moieties of the general Formula I above.

ANION EXCHANGE RESINS

It has now been discovered that basic anion exchange groups can be chemically bonded to an intermediate diphenyl ether condensation polymer having residual halomethyl groups (III: A=—$CH_2X$, X=Cl or Br) by reaction on the polymer with a basic nitrogen compound such as ammonia or an amine. Obviously, to achieve high resin capacity, it is desirable to use an intermediate condensation polymer having a high residual halomethyl content such as is obtained by the homopolymerization of CMDPE-32. By reaction of such an intermediate resinous polymer with a tertiary amine, strongly basic quaternary ammonium groups are readily and smoothly introduced into the resin structure in high yields to provide active, high capacity anion exchange resins. With ammonia, primary and secondary amines, or alkylene polyamines, weakly basic anion exchange resins comparable to present commercial weakly basic resins in utility and capacity are obtained.

In practice, many different amines can be used, particularly simple low molecular weight amines which readily diffuse into the resin particles. Particularly suitable are aliphatic amines of the general formula:

$NR_1R_2R_3$ wherein $R_1$, $R_2$, and $R_3$ individually are members of the group consisting of hydrogen, $C_1$-$C_6$ alkyl groups, $C_1$-$C_4$ monohydroxyalkyl groups, and $C_1$-$C_4$ dihydroxyalkyl groups. Also alkylene polyamines of the general formula:

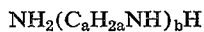

wherein $a$ is an integer from 2 to 6 inclusive and $b$ is an integer from 1 to 5, can also be advantageously employed.

Typical of the tertiary amines which are particularly valuable in the preparation of the quaternary ammonium resins when used individually or in mixtures with one another are trimethylamine, dimethylaminoethanol, dimethylisopropanolamine, methyldiethanolamine, and trimethanolamine. Weakly basic resins may be prepared with ammonia or such amines as methylamine, dimethylamine, butylamine, diisopropylamine, and methylethanolamine, or with alkylene polyamines such as ethylenediamine, propylenediamine, 1,6-diaminohexane, diethylenetriamine, tetraethylenepentamine, etc. It is often convenient to use an aqueous solution of the desired amine.

To facilitate amination, the intermediate halomethyldiphenyl ether polymer is generally crushed or ground into small particles prior to amination. However, larger pieces of resinous foam can also be aminated by reaction with an amine under appropriate conditions.

Although amination of the resinous intermediate halomethyldiphenyl ether polymer can be achieved in the absence of a solvent, it is preferably carried out in the presence of a liquid organic solvent in which the amine is soluble and which will penetrate and swell the polymer particles. Liquid aromatic hydrocarbons and halogenated aliphatic and aromatic hydrocarbons, such as benzene, toluene, methylene chloride, ethylene dichloride, tribromoethylene, and chlorobenzene, are generally suitable solvents. Occasionally a water-soluble swelling agent such as dioxane is beneficial.

The amination is carried out under mild conditions, generally at a temperature between about 0° and 40° C. and most conveniently at about room temperature. Higher temperatures can be used, but at temperatures above about 50° C., undesirable side reactions may occur, particularly with amines which can react with more than one halomethyl group. Occasionally to decrease the amination rate it may be desirable to carry out amination at a temperature below 0° C.

In practice a 5 to 20 percent excess of amine based on the residual chloromethyl content of the resin is generally added to a stirred slurry of finely crushed resin and solvent at room temperature and the mixture stirred until amination is complete. At room temperature a reaction time ranging from a few minutes to several hours is usually adequate. Analysis of the ionic chloride content of the reaction mixture provides a convenient measure of the extent of amination.

The resulting anion exchange resin is then separated from the solvent by filtration, decantation, or the like, washed with water or preferably with a water-soluble solvent such as acetone and then with water. The wet recovered resin is readily dried by heating in an air oven at 110° C. for several hours. Its anion exchange capacity is determined by standard methods.

When prepared as described above, the anion exchange resin will be in the chloride form. However, if desired, the chloride anion can be replaced in a conventional manner with other anions such as bromide, carbonate, acetate, hydroxide, nitrate, sulfate, and the like.

With trimethylamine and an intermediate resin prepared by homopolymerization of CMDPE-32, a quaternary ammonium anion exchange resin having a dry weight capacity of about 4.4 meq./g., Cl⁻ form, is readily obtained. This resin is highly effective in removing alkylbenzene sulfonates (ABS) from dilute aqueous solutions having an effective capacity for ABS of about 1.45 g./g. of dry resin, Cl⁻ form. In one test 24 mg. of this resin in finely ground form was shaken with 2 l. of a solution containing 20 p.p.m. of dodecylbenzene sulfonate. In less than one hour, 95 percent of the ABS was removed from the solution. It can also be effectively used in a fixed bed "throw-away-cartridge" filter unit for removal of ABS from a flowing stream of water contaminated with ABS.

Other quaternary ammonium anion exchange resins prepared from the intermediate diphenyl ether condensation polymer are also effective in removing ABS from dilute aqueous solutions.

Besides the anion exchange resins obtained by the reaction of the intermediate diphenyl ether condensation polymer with amines, other useful anion exchange resins are prepared by reaction of the intermediate halomethyldiphenyl ether resin with an organic sulfide. Particularly desirable are the sulfonium resins prepared from sulfides of the general formula:

$$SR_4R_5$$

wherein $R_4$ and $R_5$ individually are members of the class consisting of: (1) $C_1$–$C_6$ alkyl groups, (2) $C_2$–$C_4$ monohydroxyalkyl groups, (3) $C_1$–$C_6$ haloalkyl groups, (4) $C_7$–$C_{12}$ aralkyl groups, and (5) —$C_mH_{2m}COOQ$ wherein $m$ is an integer from 1 to 4 and Q is selected from the group consisting of hydrogen, alkali metal cations, and $C_1$–$C_6$ alkyl groups. Typical organic sulfides which may be employed are dimethylsulfide, n-butylmethylsulfide, 2 - (methylmercapto)ethanol, bis - (2 - hydroxyethyl) sulfide, and methyl 3-methylthiopropionate. Generally it is preferable to use an organic sulfide wherein one of the substituent groups contains not more than 2 carbon atoms.

Although the reaction of the resinous halomethyldiphenyl ether polymer with an organic sulfide is not as rapid as with amines, it can be carried out under similar conditions with a slurry in a suitable solvent and a reaction temperature between 20° and 60° C. With a low boiling reactant, such as dimethylsulfide, it may be necessary to employ an elevated pressure of from about 1 to 10 atmospheres. A reaction time of from 10 to 40 hours is often required for complete reaction. Then the sulfonium resin is isolated in a conventional manner. Residual traces of unreacted sulfide which may give resins prepared by this process an objectionable odor can be removed by the method of Mattano and Hatch as described in United States Patent 2,977,328. Also other anions such as carbonate, acetate, hydroxide, nitrate, sulfate, and the like can be exchanged for the halide anion.

Strong base resins with quaternary phosphonium groups can also be obtained by reacting an intermediate resinous halomethyldiphenyl ether polymer with a trisdialkylaminophosphine in the general manner described by McMaster and Tolkmith in United States Patent 2,764,560.

In summary, it has been discovered that valuable anion exchange resins can be prepared from an intermediate resinous diphenyl ether condensation polymer, preferably by the reaction of substituent halomethyl groups on the diphenyl ether moieties of the polymer with an appropriate amine, sulfide, or aminophosphine. The resulting new resins have excellent chemical and physical stability and in many applications can be used and regenerated repeatedly.

CATION EXCHANGE RESINS

It has been further discovered that useful cation exchange resins can be prepared by chemical modification of the intermediate resinous diphenyl ether condensation polymer. For example, sulfonic acid groups can be chemically bonded to the resin matrix either by direct sulfonation of the aromatic nuclei or by substitution on a $C_1$–$C_2$ side chain alkyl group to give useful strong acid resins. Weak acid cation exchange resins can be prepared by the introduction of carboxylic groups. Still further variations are possible utilizing other active ion exchange groups such as phosphonic and phosphinic groups.

With an intermediate resinous diphenyl ether condensation polymer having a low residual halomethyl content, direct substitution of sulfonic acid groups on the aromatic nuclei of the resinous matrix is readily obtained by treatment of the resin with sulfonating agents such as concentrated sulfuric acid and chlorosulfonic acid. Recently a superior sulfonating agent involving a sulfur trioxide/phosphate complex has been described by Turbak in Am. Chem. Soc., Div. Polymer Chem., Preprint 2, No. 1,140 (1961).

In practice a slurry of the intermediate resin and a solvent capable of swelling the resin, such as methylene chloride, perchloroethylene, and chlorinated aliphatic hydrocarbons or an aromatic hydrocarbon, such as benzene, toluene, or chlorobenzene is heated or cooled to the desired temperature and an excess of the sulfonating agent is added. With chlorosulfonic acid, sulfonation occurs readily at temperatures ranging from about —20° to 40° C. with a reaction time ranging from a few minutes to several hours. When concentrated sulfuric acid is used, the sulfonation is preferably carried out at a temperature between 100° to 150° C. for a period of up to 5 or more hours.

Using an intermediate polymer prepared by the condensation of CMDPE–17, which contained essentially no residual chloromethyl groups, sulfonation was achieved by heating a slurry of the polymer, concentrated sulfuric acid, and perchloroethylene at 120° C. for about 3 hours. The resulting resin had a dry weight capacity of 5.14 meq./g. corresponding to an average of 1.80 sulfonic acid groups per diphenyl ether moiety. Another sample of the same intermediate resin was sulfonated with a large excess of chlorosulfonic acid in the presence of methylene chloride at a temperature of from 20 to 40° C. to give a cation exchange resin having a capacity of 5.32 meq./g. or an average of 1.85 sulfonic acid groups per diphenyl ether moiety. If desired, such sulfonic acid resins may be neutralized with an inorganic base such as sodium carbonate or potassium hydroxide or with a water-soluble, aliphatic amine.

Use of phosphorus trichloride in the general manner described by McMaster and Glesner in United States Patent 2,764,563, provides a route for the synthesis of cation exchange resins from the resinous diphenyl ether polymer having phosphonic and phosphinic groups as the active ion exchange sites.

Another approach to the preparation of cation exchange resins having a backbone matrix of diphenyl ether moieties entails introduction of an appropriate functional group through reaction with a reactive substituent halomethyl or haloethyl group. As in the synthesis of anion exchange resins, a resinous diphenyl ether condensation polymer having a high residual halomethyl content is a particularly suitable intermediate. By formation of a covalent bond between the benzylic carbon atom of the halomethyl substituent and an appropriate reagent, many varied types of active or potentially active ion exchange group can be chemically bonded to the resinous matrix.

Representative of the many varied types of functional reagents which can be used for this purpose are: inorganic salts such as sodium cyanide, potassium thiocyanide, sodium sulfite; metal salts of active methylene compound such as sodium acetoacetic acid and sodium malononitrile; amino- and thioacids such as glycine, iminodiacetic acid, phenylalanine, mercaptosuccinic acid and glycollic acid and salts thereof; aminonitriles as diethylaminoacetonitrile, etc. With these reagents it is possible to bond to the resinous diphenyl ether polymer matrix a great variety of groups having active or potentially active ion exchange capacity.

For example, by reaction of a halomethyl resin with sodium sulfite, a strong acid, cation exchange resin is obtained having a methylene sulfonic acid group as the active ion exchange moiety. In a similar manner reaction with sodium cyanide yields after hydrolysis a weak acid cation exchange resin with methylene carboxylic acid groups bonded to aromatic nuclei of the resinous polymer matrix. It has been further discovered that by reaction with an appropriate amino- or mercaptoacid, valuable chelate resins are obtained by introduction of such groups as iminodiacetic acid or mercaptoacetic acid.

In practice, the direct reaction of the intermediate resinous halomethyldiphenyl ether polymer with many desirable functional reagents is often complicated by the physical characteristics of the reactants. Particularly troublesome is the incompatibility often encountered between the hydrophobic intermediate resinous polymer and many desirable hydrophilic reagents such as sodium iminodiacetate. Solvents which will dissolve such salts are often completely ineffective in swelling the polymer as required to enable reaction to occur throughout the resinous matrix.

This problem can be circumvented, however, by the general method described by M. J. Hatch in Canadian Patent 646,232 wherein the hydrophobic halomethyl resins are first converted to a hydrophilic sulfonium resin by reaction with an organic sulfide and then treated with the desired hydrophilic reagent to displace the sulfonium group and form an active or potentially active ion exchange resin. As described above, similar sulfonium resins can be prepared from the intermediate resinous diphenyl ether polymer. Thus, the Hatch process can be employed to prepare still other new ion exchange resins.

To achieve high yields and satisfactory conversion rates, it is generally desirable to use an excess of the functional reagent with the intermediate sulfonium resin. Usually water, methanol, ethanol, or a mixture thereof is employed as a solvent. However, because of the diverse nature of the reagents which can be used, no one solvent will be optimum for all systems. Judicious choice must be made based on the properties of the particular reagent and intermediate resin and may be confirmed by simple test.

The reaction between the intermediate sulfonium resin and functional reagent is advantageously carried out at a reaction temperature between 50° and 100° C. for a time of from 2 to 48 or more hours. Higher temperatures are usually not required. If lower temperatures are employed, longer reaction times are required for complete reaction. While the reactions are usually conducted at atmospheric pressure, it may be desirable occasionally to use a pressure of from 1 to 10 atmospheres.

In summary, by appropriate chemical modifications of the intermediate resinous diphenyl ether polymers valuable cation and chelate exchange resins are obtained. These novel ion exchange resins have excellent chemical and thermal stability as well as high ion exchange capacities and rates. Furthermore, for many purposes, they can be regenerated for repeated use.

The following examples illustrate further the invention described herein, but are not to be construed as limiting its scope. Unless otherwise specified, all parts and percentages are by weight.

*Example 1.—Intermediate resinous diphenyl ether condensation polymers*

Following the general procedure described by Doedens in United States Patent 2,911,380, intermediate resinous diphenyl ether polymers were prepared by the condensation polymerization of various mixtures of chloromethyldiphenyl ethers (CMDPE). Data from a series of typical polymerizations carried out in the presence of a catalytic amount of $FeCl_3$ at a temperature between 100° and 120° C. are presented in Table 2. In these polymerizations an average of only slightly more than one chloromethyl group per diphenyl ether moiety was consumed. The resinous products were obtained as a dark colored, rigid foam which could be easily crushed into fine particles.

TABLE 2.—CMDPE CONDENSATION POLYMERS

| Polymer | Initial Monomer [a] | Weight percent Residual Cl |
|---|---|---|
| 1A | CMDPE-17 (1.12 $ClCH^2$—/DPE) | <0.5 |
| 1B | CMDPE-25 (1.85 $ClCH^2$—/DPE) | 7.9–11.2 |
| 1C | CMDPE-32 (2.85 $ClCH^2$—/DPE) | 15.0–17.0 |

[a] Typical monomer compositions are given in Table 1.

1D. A portion of the resinous polymer obtained from CMDPE-32 (Ex. 1C) was further chloromethylated by stirring a slurry of 50 parts of crushed CMDPE-32 polymer, 50 parts of anhydrous $FeCl_3$ and 850 parts of chloromethyl methyl ether at 40°–50° C. for 5 hours. Then the resinous particles were recovered and washed with methanol to remove residual catalyst and reagent.

*Example 2.—Trimethylammonium anion exchange resin*

A. To a stirred slurry of 10 parts of finely divided resin obtained by the polymerization of CMDPE-32 (Ex. 1C) and from 2 to 5 parts of methylene chloride was added at room temperature 30 parts of 20% aqueous trimethylamine. The heterogeneous mixture was stirred vigorously for 30 minutes, a time sufficient for complete amination as indicated by analysis for ionic chloride.

The pale yellow-orange quaternary trimethylammonium anion exchange resin was isolated by filtration, washed with dilute acid and then with water. The final wet filtered resin was a stable porous solid having a water content varying from about 60 to 75 wt. percent depending on filtration technique. After drying for several hours in an air oven at about 110° C., a dry granular anion exchange resin was obtained.

As determined by conventional methods, the dry weight capacity of the resin was about 4.40 meq./g. Cl⁻ form. The selectivity coefficient for chloridehydroxide exchange with this trimethylammonium resin is about 12.5. Since this selectivity coefficient did not change appreciably with variations in anionic composition, the quaternary ammonium groups are relatively unhindered and distributed fairly uniformly throughout the resinous matrix.

The trimethylammonium resin in either dry or wet form is easily crushed or ground to a finer particle size if desired. In the chloride form the resin is stable at temperatures greater than 120–150° C.

B. In a similar manner other intermediate polymers described in Example 1 were aminated with trimethylamine. With the polymer from CMDPE-17 sufficient quaternary ammonium groups were introduced to make the resin particles wettable with water, but the resin capacity was never greater than 0.1 meq./g. dry weight, Cl⁻ form. In general, an ion exchange capacity greater than 1.0 meq./g. dry weight has not been obtained with less than about 20 wt. percent chlorine in the initial CMDPE, i.e., an average of about 1.3 $ClCH_2$—/DPE. The increased capacity of the rechloromethylated intermediate polymer (Ex. 1D) indicates that there was further chloromethylation, but the reduction in water content of the wet resin also suggests considerable additional cross-linking under the vigorous chloromethylation condition employed.

Data from several typical aminations are given in Table 3.

TABLE 3.—TRIMETHYLAMMONIUM ANION EXCHANGE RESINS

| Polymer | Initial Monomer | Anion Exchange Resin | |
|---|---|---|---|
| | | Wt. Percent $H^2O$ | Meq./G. Dry Clc Form |
| 1A | CMDPE-17 | ~50 | <0.1 |
| 1B | CMDPE-25 | ~45 | 2.0–2.5 |
| 1C | CMDPE-32 | 60–70 | 4.2–4.4 |
| 1D | CMDPE-32[a] | 49 | 4.75 |

[a] Further chloromethylated after polymerization.

C. In further runs, it was found that the amount of methylene chloride can be varied from 0.2 to 5 parts per part of intermediate polymer without markedly changing the amination results. In the absence of a solvent, the reaction as indicated by the color change was appreciably slower with up to 72 hours required for complete amination. Generally a 10% excess of trimethylamine calculated on the basis of the total active residual chlorine was adequate for smooth amination.

The amination is also readily carried out with other tertiary amines such as dimethylethanolamine, triethylamine, etc.

*Example 3.—Weakly basic anion exchange resin*

To a slurry of 100 parts of crushed CMDPE-32 polymer foam (Ex. 1C), 900 parts of perchloroethylene and 1370 parts of 50% sodium hydroxide was added 100 parts of diethylenetriamine. The temperature of the stirred slurry was raised to 120° C. over a period of about 5 hours. Additional water was added as required to azeotrope off the perchloroethylene. The resulting weakly basic anion exchange resin was washed by decantation, filtered and then screened to give a fraction which was roughly 50 mesh in size. A portion of this resin was loaded into an ion exchange column and an operating capacity of 14.0 kg. $CaCO_3/ft.^3$ wet resin was determined by standard techniques.

*Example 4.—Sulfonium resin*

To a slurry of finely divided CMDPE-32 resin (Ex. 1C) in an equal weight of methylene chloride was added an excess of dimethylsulfide. The mixture was shaken at room temperature for about 4 days during which time the red polymer became yellow in color. The product was filtered and washed with water. The water swollen resin had a wet weight capacity of 1.12 meq./g.

*Example 5.—Sulfonic acid resin*

A. To a slurry of 6 parts of the intermediate polymer prepared from CMDPE-17 (Ex. 1A) in 40 parts of perchloroethylene was added 145 parts of concentrated sulfuric acid. The mixture was heated at about 120° C. for about 3 hours. The resulting sulfonic acid resin was isolated and washed free of acid. The resin had a moisture content of 62% and a dry weight capacity of 5.19 meq./g. $H^+$ form.

B. A similar sample of CMDPE-17 resin was sulfonated at room temperature with a large excess of chlorosulfonic acid in the presence of methylene chloride. After treating the resulting resin with concentrated caustic to hydrolyze any sulfuryl chloride groups, a sulfonic acid resin was obtained having a dry weight capacity of 5.32 meq./g.

*Example 6.—Methylene sulfonic acid resin*

A mixture of several parts of the sulfonium resin described in Example 4, 4 parts of sodium sulfite and sufficient water to form a fluid slurry was heated on the steam bath for 4 days. The insoluble resin was then recovered, washed with water and converted into the acid form by treatment with hydrochloric acid. The resulting resin had a water content of 71.8% and a hydrogen exchange capacity of 2.7 meq./g. dry weight basis.

*Example 7.—Chelate resin*

A sample of finely divided CMDPE-32 resin (Ex. 1C) was aminated with 25% of the theoretical amount of trimethylamine in the presence of methylene chloride. The resulting partially aminated resin was isolated and treated with a solution of excess disodium iminodiacetate in aqueous methanol for 5 hours at room temperature. The recovered resin had a water content of 47% and a dry weight chelate exchange capacity of 1.2 mmoles of $Cu^{++}/g.$

*Example 8.—Removal of alkylbenzene sulfonates (ABS)*

A sample of the trimethyl quaternary ammonium anion exchange resin in the chloride form, prepared as described in Example 2A and having a dry weight capacity of 4.72 meq./g. $Cl^-$ form, was ground in a rod mill to an average particle size of about 5 microns and then dried at 110° C. for several hours.

A. To test the effectiveness of the quaternary ammonium resin in the removal of ABS, the theoretical amount of the dried finely ground resin (24 mg.) was added to each of several 2 liter samples of a standard ABS solution containing 20 mg. of dodecylbenzene sulfonate per liter. The test mixtures were shaken at room temperature for a given time before aliquots were taken, filtered, and analyzed for residual ABS by a standard methylene blue colorimetric analysis. Typical results are given in Table 4.

TABLE 4.—ABS REMOVAL BY BATCH CONTACT

| Sample | Contact Time, min. | Residual ABS, p.p.m. | Percent ABS Removed |
|---|---|---|---|
| Blank | | 20.0 | |
| 1 | 10 | 10.0 | 50 |
| 2 | 20 | 5.0 | 75 |
| 3 | 30 | 2.5 | 87.5 |
| 4 | 60 | 1.0 | 95 |
| 5 | 300 | 0.10 | 99.8 |

B. In another evaluation a disposable cartridge filter having a cartridge 2″ deep and 5⅝″ in diameter was filled with a similar trimethyl quaternary ammonium resin prepared as described in Example 2A but without further grinding or drying after amination. The amount of wet resin loaded was equivalent to about 300 g. of ABS. Then a solution containing 50 p.p.m. dodecylbenzene sulfonate was passed through the filter at a flow rate of 5.0 gallons per minute per ft.² of bed cross-sectional area. A total of 230 gallons of the ABS solution passed through the filter before the ABS concentration in the eluent rose above 0.5 p.p.m. Thereafter the ABS content of the eluent slowly increased.

C. In further similar tests it was determined that sodium lauryl sulfonate was also effectively removed by the trimethyl quaternary ammonium resin, and that the efficiency of the resin was relatively insensitive to a variation in solution pH within the range from 4.9 to 11.

We claim:

1. A water-insoluble resinous polymer having active or potentially active ion exchange groups chemically bonded to a resinous polymeric matrix prepared by the condensation polymerization of a diphenyl ether derivative of the formula:

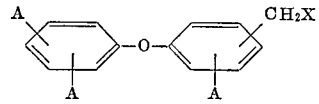

wherein each A individually is H or $C_nH_{2n}X$ wherein $n$ is an integer from 0–2 inclusive, and X is Cl, Br, OH, or OR′, R′ being a $C_1$–$C_4$ alkyl group, and comprising in major proportion a plurality of diphenyl ether moieties linked and cross-linked with methylene bridges, said ion exchange groups being chemically bonded to aromatic nuclei of the diphenyl ether moieties as substituents of the general formula:

wherein each $n$ is an integer from 0 to 2 inclusive and Z is a group containing (a) an active ion-exchange group of the class consisting of —$NH_3^+$, >$NH_2^+$, >$NH^+$—, >$N^+$<, >$S^+$—, >$P^+$<; and —$SO_3H$, —OH, —COOH, —$PO_3H_2$, —$HPO_2H$ and salts thereof; or (b) a potentially active ion exchange group of the class consisting of nitriles, esters, amides, anhydrides, and acid chlorides of carboxylic, phosphoric and sulfonic acids which may be converted by simple hydrolysis into active ion-exchange groups.

2. The insoluble resinous polymer of claim 1 wherein $n$ is one and Z is a quaternary ammonium group.

3. The insoluble quaternary ammonium anion exchange resin of claim 2 wherein Z is a trimethylammonium group.

4. A process for the removal of alkylbenzene sulfonates from aqueous solutions thereof which comprises contacting said solution with the insoluble quaternary ammonium anion exchange resin of claim 2.

5. The process of claim 4 wherein the resin is in finely divided form with an average particle size of less than 10 microns.

6. The insoluble resinous polymer of claim 1 wherein $n$ is one and Z is a weakly basic amino group.

7. The weakly basic anion exchange resin of claim 6 wherein Z is an amino group derived from diethylenetriamine.

8. The insoluble resinous polymer of claim 1 wherein $n$ is one and Z is a sulfonium group.

9. The sulfonium resin of claim 8 wherein Z is a sulfonium group derived from dimethylsulfide.

10. The insoluble resinous polymer of claim 1 wherein $n$ is 0 and Z is a sulfonic acid group.

11. The insoluble resinous polymer of claim 1 wherein $n$ is 1 and Z is a sulfonic acid group.

12. The insoluble resinous polymer of claim 1 wherein $n$ is 1 and Z is an amino acid moiety derived from iminodiacetic acid.

13. The water-insoluble resinous polymer of claim 1 wherein the polymeric matrix is prepared by condensation polymerization of a monomer consisting essentially of a halomethyldiphenyl ether containing an average of 1.1–4.0 chloro- or bromethyl groups per diphenyl ether moiety and from 0–20 weight percent of a reactive non-halomethyl aromatic modifier.

References Cited by the Examiner
UNITED STATES PATENTS

| 2,499,215 | 2/1950 | De Benneville | 260—52 |
| 3,047,518 | 7/1962 | Doedens et al. | 260—2.5 |

References Cited by the Applicant
UNITED STATES PATENTS

| 2,764,560 | 9/1956 | McMaster et al. |
| 2,764,563 | 9/1956 | McMaster et al. |
| 2,882,247 | 4/1959 | Haagen et al. |
| 2,911,380 | 11/1959 | Doedens. |
| 2,977,328 | 3/1961 | Mattano et al. |
| 3,075,929 | 1/1963 | Hebert et al. |

FOREIGN PATENTS

| 646,232 | 8/1962 | Canada. |

WILLIAM H. SHORT, *Primary Examiner.*

C. A. WENDEL, *Assistant Examiner.*